UNITED STATES PATENT OFFICE.

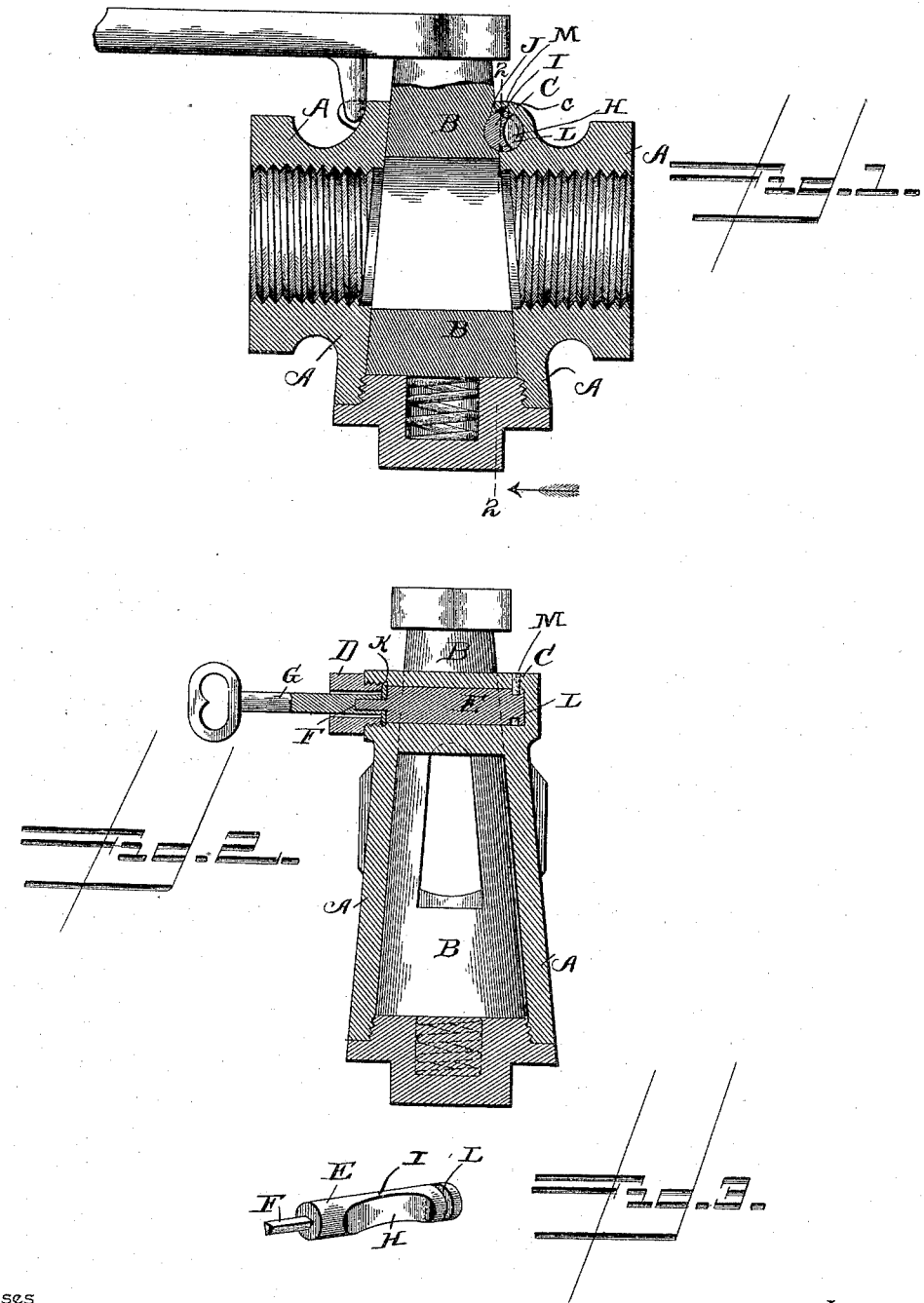

GEORGE M. TOWER, OF FITCHBURG, MASSACHUSETTS.

VALVE-LOCK.

SPECIFICATION forming part of Letters Patent No. 492,313, dated February 21, 1893.

Application filed July 26, 1892. Serial No. 441,275. (No model.)

*To all whom it may concern:*

Be it known that I, GEORGE M. TOWER, a citizen of the United States, residing at Fitchburg, in the county of Worcester and State of Massachusetts, have invented a new and useful Valve-Lock, of which the following is a specification.

This invention relates to valve locks; and it has for its object to provide an improved lock adapted to be used in connection with cocks and faucets of any character, and is designed to provide means for holding the valve locked in its opened position, so that the same cannot be shut off unless by the proper party. To this use the valve is particularly adapted upon air brake valves where it is most essential that the valves or cocks be not interfered with.

With these and many other objects in view which will readily appear as the nature of the invention is better understood, the same consists in the novel construction, combination and arrangement of parts hereinafter more fully described, illustrated and claimed.

In the accompanying drawings;—Figure 1 is a vertical sectional view of a stop cock provided with a locking device as contemplated by this invention. Fig. 2 is a vertical sectional view on the line 2—2 of Fig. 1. Fig. 3 is a detail in perspective of the oscillating locking tumbler.

Referring to the accompanying drawings;— A represents an ordinary valve casing in which is mounted the valve plug B, oscillated in the ordinary manner within the valve casing. The said valve casing is provided at one side of the plug bearing and near the upper end thereof, with the cylindrical bearing chamber C, which chamber opens at one side as at c, into the bearing of the valve casing, and is inclosed at its open end by the screw cap D. The said cylindrical bearing chamber C accommodates the cylindrical oscillating locking tumbler E, which tumbler is provided at its outer end projecting into the perforated screw cap D, with a squared head F which is designed to receive the operating key G, by means of which the said tumbler is operated within its bearing. The oscillating tumbler E is provided with a concaved recess H in one side thereof which recess corresponds to the curvature of the valve casing bearing and of the valve plug therein, so that the valve plug can be easily turned without interference from said tumbler, when said concaved recess aligns with the opening c and forms a part of the plug bearings. When the valve plug B is turned into its open position, and it is desired to lock the same in such position by means of the key G, the tumbler D is oscillated to throw the rounded locking portion I into the concaved locking notch J, in one side of the valve plug and near the upper end thereof. The locking tumbler must be oscillated to turn the rounded locking portion thereof out of the locking notch of the valve plug before the plug can be closed as will be readily apparent.

A packing washer K is interposed between the ends of the screw cap D and the locking tumbler so that the squared head or shank F of said tumbler projects through said washer, and thus provides a construction whereby the friction of the tumbler in its bearing is increased, thereby preventing the tumbler from being turned easily without a good fitting key, while at the same time said washer avoids any leakage from the main casing through the plug bearing.

In order to limit the rotation of the oscillating locking tumbler E, so that the same can be moved but a half turn in either direction to lock and unlock the plug G, I further provide said tumbler with a semi-circular limiting slot L formed near the inner end of the same and into which projects the stop pin M which projects inwardly from the top of the valve casing A and provides means for stopping the tumbler at the ends of said slot so as to hold the tumbler in its locking or unlocked positions.

The construction, operation and many advantages of the herein described valve locking device are now thought to be apparent without further description.

Having thus described my invention, what I claim, and desire to secure by Letters Patent, is—

The combination of a valve casing having a cylindrical transverse bearing chamber, open at one end and opening into the plug bearing of the casing near its upper end, a stop pin projecting inwardly into said bearing chamber near its closed end, the valve plug arranged within the casing and having near its upper end a rounded or concaved locking notch adapted to be aligned with and form a part of said bearing chamber when open, an oscillating cylindrical locking tumbler mounted for rotation in said transverse bearing chamber, and provided with a concaved recess in one side adapted to form a continuation of the plug bearing in the casing when the tumbler is turned in one direction, and also forming an opposite rounded locking portion adapted to register with the rounded locking notch in the valve plug when the tumbler is turned in the opposite direction, a semi-circular limiting slot near one end adapted to receive said inwardly projecting stop pin, and a squared key end, a perforated cap receiving said squared key end and closing the open end of the transverse bearing chamber, and a key adapted to engage said squared key end, substantially as set forth.

In testimony that I claim the foregoing as my own I have hereto affixed my signature in the presence of two witnesses.

GEORGE M. TOWER.

Witnesses:
WILLIE A. DRAKE,
GEO. H. CHANDLER.